United States Patent Office 3,413,258
Patented Nov. 26, 1968

3,413,258
ENHANCEMENT OF RESISTANCE OF OLEFIN POLYMERS TO HEAT DETERIORATION
Harry Braus, Springdale, and Jay R. Woltermann, Cincinnati, Ohio, assignors to National Distillers and Chemical Corporation, New York, N.Y., a corporation of Virginia
No Drawing. Filed Oct. 20, 1966, Ser. No. 587,959
13 Claims. (Cl. 260—41)

ABSTRACT OF THE DISCLOSURE

Polyolefins are rendered heat-stable by the incorporation therein of a trialkylphenylmercaptoalkylene phosphite and, optionally, a hindered phenol and/or carbon black.

---

This invention relates to new compounds, stabilizer compositions useful in the enhancement of the resistance of olefin polymers, such as ethylene polymers and propylene polymers and other polymers of alpha-mono-olefins having up to 6 carbon atoms, copolymers thereof and polystyrene, to deterioration in physical properties due to heat, comprising a trialkylphenylmercaptoalkylene phosphite and optionally, a hindered phenol, and to olefin polymer compositioins having an enhanced resistance to heat deterioration, due to incorporation therein of such compounds, and to a process of enhancing the resistance of olefin polymers to heat deterioration.

Many of the most important applications of polyethylene and polypropylene such as their use in cable sheathings depend upon their superior physical properties, as evaluated by rate of increase in melt index, ageing, and differential thermal analysis. Other uses take advantage of their high dielectric strength in applications such as primary insulation of wire conductors.

Unfortunately, however, polymeric materials such as polyethylene and polypropylene are subject to deterioration in air and weather from sunlight, i.e., ultraviolet radiation, and heat, both of which induce oxidation of the polyethylene and/or polypropylene and thereby lead to increased brittleness at low temperatures and reduced tensile strength and dielectric properties.

In addition, when polyethylene is mechanically worked in the presence or absence of air at the elevated temperatures necessary for processing, molecular structure changes occur wherein the polymer becomes lower in gressively poorer. At the same time, undesirable changes occur in both the viscous and elastic components of melt flow behavior. Furthermore, cross-linking occurs upon progressively poorer. At the same time, undesirable changes occur in both the viscous and elastic components of melt flow behavior. Furthermore, cross-linking occurs upon prolonged exposure of the polymer to ultraviolet radiation in the presence of air.

It is customary to incorporate small amounts of so-called thermal stabilizers or antioxidants into the polymer to enhance the resistance thereof to thermal and oxidative degradation, such as various amines, diaryl monosulfides, phenolic compounds, organic phosphites, and the like.

German Auslegeschrift No. 1,130,162 dated May 24, 1962, described a process for the stabilization of polyolefins using a composition composed of a mixture of phenols or phenol derivatives and a sulfur-containing phosphite of the formula

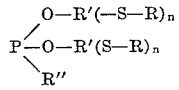

in which $n$ is one or two, R is an aliphatic hydrocarbon group with from one to twenty carbon atoms, a cycloalkyl, aryl, alkylaryl or arylalkyl group, R' is alkylene group having from one to ten carbon atoms, and R'' is an alkyl, cycloalkyl, aryl, alkylaryl or arylalkyl group, or the group —(O—R'—S—R) or —O—R'(—S—R)$_2$.

The phenol and phosphite are used in the proportions of 5:1 and 1:5. There are no specific examples of compounds coming within this general formula other than the alkylmercaptoalkyl phosphites.

In accordance with the instant invention, new phosphites are provided, trimercaptoalkylene phosphites having an alkyl-substituted phenyl group linked directly to the mercapto sulfur atom by a ring carbon of the phenyl group and thence through the alkylene group to the oxygen of the phosphite group. These compounds are especially effective heat stabilizers for olefin polymers. The presence of the alkyl substituent on the phenyl group is extremely important to this stabilizing effectiveness. Triphenylmercaptoalkylene phosphites are rather poor stabilizers, in comparison.

The special properties of the trialkylphenylmercaptoalkylene phosphites are enhanced when combined with a hindered phenol so that the two component combination is more effective than either taken separately. This suggests that the hindered phenol synergizes the effectiveness of the phosphite.

In accordance with the instant invention, polyolefin compositions are provided consisting essentially of the polyolefin and trialkylphenylmercaptoalkylene phosphite in an amount to improve resistance of the polyolefins to heat-induced deterioration, for long periods of time. The polyolefin compositions of the invention, such as polyethylene compositions, have an enhanced resistance to deterioration in physical properties on exposure to heat due to the effect of the trialkylphenylmercaptoalkyl phosphite.

Further, in accordance with the instant invention a process for enhancing the resistance of olefin polymers, such as ethylene polymers, to deterioration of physical properties upon exposure to heat is provided, which comprises incorporating in the olefin polymer a trialkylphenylmercaptoalkylene phosphite, and preferably a trialkyl- The trialkylphenylmercaptoalkylene phosphite compounds in accordance with the invention can be defined by the formula:

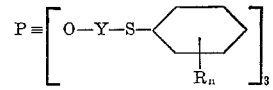

in which Y is an alkylene group having from one to ten carbon atoms, R is an alkyl group having from one to twelve carbon atoms and $n$ is an integer from one to five. The alkyl and alkylene groups can have a straight or branched chain. Usually, the phosphite will not have more than about sixty carbon atoms.

As typical R radicals there can be mentioned methyl, ethyl, propyl, isopropyl, butyl, sec-butyl, tert-butyl, isoamyl, hexyl, octyl, isooctyl, 2-ethyl hexyl, nonyl, lauryl, and decyl.

Typical Y radicals are:

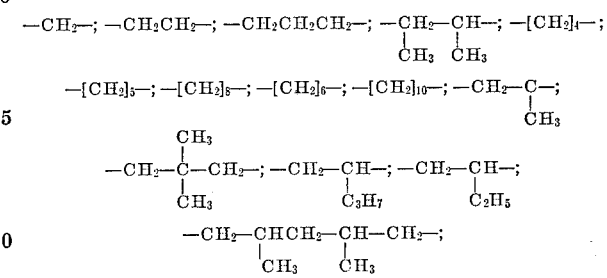

and $$-\underset{\underset{CH_3}{|}}{\overset{\overset{CH_3}{|}}{C}}-CH_2-$$

The preferred trialkylphenylmercaptoalkylene phosphites are tri(2-methyl-4-tert-butylphenylthioethyl) phosphite and tri(4-tert-butylphenylthioethyl) phosphite. Others suitable include, but are not limited to, tri(2-tert-butylphenylthiopropyl) phosphite, tri(2-ethyl-4-tert-butyl-phenylthioethyl) phosphite, tri(4-tert-butyl-2-ethylphenyl-thioethyl) phosphite, tri(2-methyl-4-tert-butyl-phenylthio-neopentyl) phosphite, tri(4-isomylphenylthioethyl) phosphite, tri(4-isopropyl-phenylthiopropyl) phosphite, tri(4-ethyl-phenylthioethyl) phosphite, tri(2,4-diethyl phenyl thioethyl) phosphite, tri(3,4-di-tert-butylphenylthioethyl) phosphite, tri(4-hexylphenylthioethyl) phosphite, tri(2,4,5-triethyl-phenylthioethyl) phosphite, tri(2,4,5-tri-butyl-phenylthioethyl) phosphite, tri(4-isooctyl-phenylthiobu-tyl) phosphite, mono(4-tert-butyl-phenylthioethyl) (di-(2-ethylhexylphenylthioethyl) phosphite, tri(3-nonyl-phenyl-thiobutyl) phosphite, (2,4-di-isooctylphenylthio-α-methyl-ethyl) phosphate, di-(3,5-di-isooctylphenylthioethyl) (mono-4-nonylphenylthio-α-methyl-ethyl) phosphite, tri-(2,4-diethylhexylphenylthioethyl) phosphite, mono(2-tert-butylphenylthioethyl) di(4-hexylphenylthioethyl) phosphite, tri(2-nonylphenylthiobutyl) phosphite, tri(2,4,5-tridecylphenylthiopropyl) phosphite, tri(2-methyl-3-ethyl-4-decyl-phenylthiopropyl) phosphite, and tri(4-lauryl-phenylthiopropyl) phosphite.

The terms "mercapto" and "thio" are used interchangeably herein.

The alkylphenylmercaptoalkylene phosphites can be prepared by known procedures which form no part of the instant invention. Thus, for example, they can be readily prepared by reaction of the appropriate α,ω-alkylene chlorohydrin to form a thio-alcohol which is subsequently transesterified using a trialkylphenyl phosphite plus sodium ethylate to form the corresponding trialkylphenyl-mercaptoalkylene phosphite.

The alkylphenylmercaptoalkylene phosphite can also be prepared by reacting tri(chloroalkoxy) phosphite and an alkylphenylthio-sodium compound in the presence of nitrogen in accordance with the following equation:

$$\underset{R_n}{\left\langle\bigcirc\right\rangle}-S-Na + P\equiv(OYCl)_3 \longrightarrow$$

$$P\equiv\left[O-Y-S-\underset{R_n}{\left\langle\bigcirc\right\rangle}\right]_3 + 3NaCl$$

wherein R, n and Y are as described hereinbefore.

The preparation of two alkylphenylthioalkylene phosphites in accordance with this invention are illustrated in Examples A and B.

EXAMPLE A

Tri(2-methyl-4-tert-butylphenylthioethyl) phosphite was prepared as follows:

54.1 g. 4-tert-butyl-o-thiocresol (0.3 mole) was added to a cold stirred solution of 6.9 g. sodium metal (0.3 atom) in 200 ml. of ethanol. The reaction was slightly exothermic. 100 ml. of the ethanol was evaporated from the solution, which was then stoppered and set aside for future use.

26.9 g. of tri(chloroethoxy) phosphite (0.1 mole) and 100 ml. of benzene were charged under a slow stream of nitrogen to a dry liter flask, equipped with a stirrer, nitrogen inlet, thermometer, addition funnel protected with a drying tube (CaSO$_4$) and a reflux condenser also protected with a drying tube (CaSO$_4$). This solution was heated to reflux with stirring and solution A was added slowly thereto, keeping the batch between pH 6 and 7. Heating was continued for 1 hr. after the addition was complete. After this period the contents of the flask were filtered while hot. The filtrate was stripped of solvent under reduced pressure and the residue was treated with carbon black and filtered.

Infrared and chemical analyses confirmed the structure and content of the desired product. Chemical analysis showed Theoretical: C, 65.7%; H, 11.4%; S, 12.5%. Actual: C, 66.83%; H, 11.97%; S, 12.69%.

EXAMPLE B

Tri(4-tert-butylphenylthioethyl) phosphite in accordance with the instant invention was prepared as follows:

The same procedure as in Example 1 was followed except that 50.5 g. of 4-tert-butyl thiophenol (0.3 mole) was used in place of the 54.1 g. 4-tert-butyl-o-thiocresol.

Chemical analysis of this product showed

Theoretical: C, 65.5%; H, 7.8%; S, 14.6%. Actual: C, 64.27%; H, 8.26%; S, 14.00%.

The reaction product can be composed of a mixture of mono- and di- acid and/or tri-substituted neutral phosphites, which can be employed as such in the instant invention.

The phenols which can be used herein should be hindered, i.e., substituted in both positions ortho to the hydroxyl group, and can contain from about eight to about 300 carbon atoms. Such phenols can be monocyclic or polycyclic, and monohydric or polyhydric.

The hindered monocyclic phenols which can be employed have the structure:

$$(R)_{n_2}-\left\langle\bigcirc\right\rangle-(OH)_{n_2}$$

R is selected from the group consisting of halogen; and organic radicals containing from one to about thirty carbon atoms, such as alkyl, aryl, alkenyl, alkaryl, aralkyl, cycloalkenyl, cycloalkyl, alkoxy, aryloxy and acyl $$\underset{O}{\overset{\|}{(R'C-)}}$$

where R' is aryl, alkyl or cycloalkyl.

$n_1$ is an integer from two to four, and $n_2$ is an integer from one to four, and the sum of $n_1$ and $n_2$ does not exceed six. The monocyclic phenols containing one or more hydroxyl groups should be substituted in both positions ortho to each hydroxyl group.

Hindered polycyclic phenols include aromatic nuclei which are linked by a bivalent linking radical, and are defined by the formula:

$$(R_1)_{n_1}-\underset{(R_2)_{n_3}}{\left\langle\overset{(OH)_{n_2}}{\bigcirc}\right\rangle}-\left[Y_1-\left\langle\overset{(OH)_{n_2}}{\bigcirc}\right\rangle-Y_2-\right]_{y_1}\left\langle\overset{(OH)_{n_2}}{\bigcirc}\right\rangle-(R_3)_{n_1}\Bigg]_{y_2}$$

wherein both the $R_1$ and $R_3$ radicals are ortho to one OH unless Y is in an ortho position.

$R_1$, $R_2$ and $R_3$ are inert substituent groups of the type of R above, Y and $Y_2$ are bivalent linking radicals, and are selected from the group consisting of oxygen, alkylene, alicyclene, arylene, mixed alkylene-alicyclene, and mixed alkylene-arylene groups, having a straight or branched chain whose total number of carbon atoms ranges from one to about eighteen. $n_2$ is as before, and $n_1$ is an integer from one to four, $n_3$ is an integer from zero to three, and $n_4$ is an integer from one to three. $y_1$ can be an integer from zero to about six, and $y_2$ an integer from one to five, preferably one or two.

Preferably, the hydroxyl groups in polycyclic phenols are located ortho and/or para to Y. There can be from one to four hydroxyl groups per phenyl nucleus, $n_2$ and $n_4$ representing the numbers thereof, each phenyl nucleus being substituted in both positions ortho to each hydroxyl group. Preferably, there will be only one hydroxyl group per phenyl nucleus.

Y can be a single bond, as in diphenyl, or a bivalent group, such as:

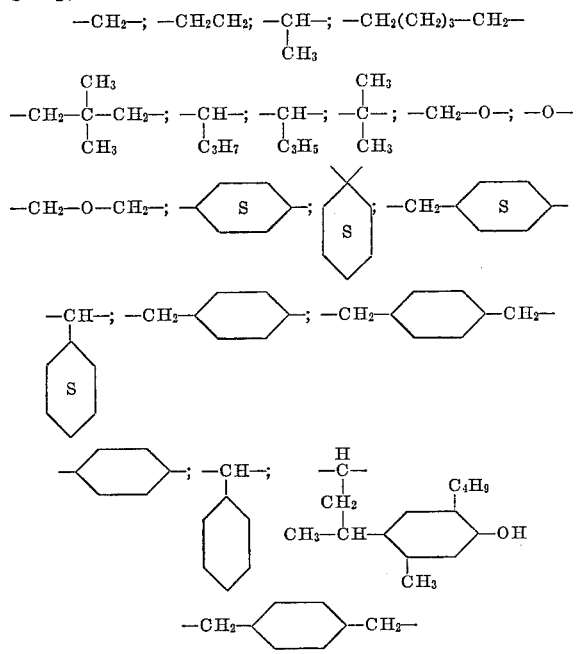

Representative phenols include 2,6 - di - tert - butyl-4-methyl phenol, 2-tert-butyl-6-methoxy phenol, 2,6-dinonyl phenol, 2,3,4,6-tetradecyl phenol, 2-isopropyl-5-dodecyl phenol, 2-methyl-6-octyl phenol, 2-hexyl-6-n-decyloxy phenol, 2-nonyl-3-methyl-6-n-decyloxy phenol, and 2-nonyl-6-benzyloxyphenol, 2,6-di-tert-butyl - 2 - methoxy-p-cresol (Antioxidant 762) and 3,5-di-tert-butyl 4-hydroxybenzyl ether.

Exemplary polyhydric monocyclic phenols are: 2-ethyl-4-octyl-6-methyl resorcinol, 2-dodecyl-4-methyl-6-nonyl-resorcinol, 2 - methyl-4-isooctyl-6-dodecyl-phloroglucinol, 2,4,6-tri-tert-butyl resorcinol, and 2,4,6-triisopropyl phloroglucinol.

Exemplary polyhydric polycyclic phenols are 2,2'-methylenebis (6-tert-butyl-phenol), 2,2'-methylene-bis (4-methyl-6-tert-butyl-phenol) (Cyanamid 2246), 4,4'-methylenebis(2,6 - di-tert-butyl-phenol) (Ethyl Antioxidant 712 or Ionox 220), 2,2'-methylene-bis(4-ethyl-6-tert-butylphenol) (Cyanamid 162), 4,4'-methylene-bis-(6-tert butyl-o-cresol) (Ethyl Antioxidant 220), 4,4'-oxobis(2-methyl-6-isopropyl phenol), 2,2'-oxobis(6-dodecyl phenol), 4,4' - n-butylidene-bis(2-tert-butyl-6-methylphenol), 4,4' - benzylidenebis(2-tert-butyl-6-methylphenol), 4,4'-cyclohexylidenebis(2,6-di-tert-butyl phenol), 1,3,5-tri methyl-2,4,6-tris(3,5-di-tert-butyl-4-hydroxy benzyl benzene) (Ionox 330), 2,2' - methylene-bis(4-methyl-6-(1'-methyl-cyclohexyl)-phenol), 2,6 - bis(2'-hydroxy-3'-tert-butyl - 5' - methylbenzyl)-4-methyl-phenol, 1,1,3-tris(2'-methyl-4'-hydroxy-4'-tert-butylphenyl) butane and $\alpha^2,\alpha^6$-bis(3-tert-butyl-5-methyl-2-hydroxy-phenyl)mesitol.

The preferred stabilizer system of the invention comprises two stabilizers, the trialkylphenylmercaptoalkylene phosphite and hindered phenol. These two stabilizers together display a stabilizing effectiveness which can extend that obtainable from either alone. This enhanced stabilizing effect is obtained with any olefin polymer, regardless of the process by which it is prepared.

A sufficient amount of the stabilizer combination of the invention is used to enhance the resistance of the olefin polymer against deterioration in physical properties, including, for example, resistance to embrittlement upon exposure to heat under the conditions to which the polymer will be subjected. Small amounts are usually adequate. Amounts of the trialkylphenylmercapto-alkylene phosphite within the range from about 0.002 to about 5.0% by weight of the olefin polymer are satisfactory. Preferably, from about 0.05 to about 1% of the trialkylphenylmercaptoalkylene phosphite is employed for optimum enhancement of resistance to heat deterioration.

When the hindered phenol is used, the used quantity can be as low as about 0.002%, and as high as about 0.5% by weight of the olefin polymer, and preferably from about 0.02 to about 0.1% by weight of the olefin polymer.

The two-component combinations of stabilizers of the invention will generally contain from about 5 to about 100 parts of the trialkylphenylmercaptoalkylene phosphite, and from about 2 to about 10 parts of the hindered phenol.

Other thermal stabilizers can be employed in the compositions of the present invention such as organic phosphites, thiodipropionic acid esters, polyvalent metal salts of organic acids, organic polysulfides, aminophenols, and the like. Light stabilizers can be employed in the composition of the instant invention such as carbon black and/or various 2-hydroxybenzophenones, thiosalicylates and the like.

Conventional additives such as fillers, pigments, and plasticizers can also be present.

If a combination of stabilizers is to be marketed, it can be formulated as a simple mixture for incorporation in the polymer by the polymer manufacturer or by the converter. An inert organic solvent can be used to facilitate handling, if the ingredients do not form a homogeneous mixture or solution.

The stabilizer of the invention is applicable to olefin polymers prepared by any of the various procedures, using the available catalysts, such as the Ziegler, ICI, Union Carbide, Du Pont, Phillips, Montecatini, Esso and Standard Oil (Indiana) process polymers (Chem. & Eng. News, Nov. 21, 1960, pp. 36–59), inasmuch as the molecular weight and tacticity are not factors affecting this stabilizer.

The stabilizer of the invention is particularly applicable to ethylene homopolymers, which include normally solid low or high molecular weight homopolymers obtained from ethylene. Such polymers usually have a molecular weight of at least 6,000 and preferably a molecular weight of 20,000 to 30,000 or more. They have a waxy feel, and when examined by the X-ray diffraction technique exhibit the presence of a crystalline phase.

Mixtures of ethylene homopolymers with other compatible polymers, and copolymers of ethylene wtih copolymerizable monomers such as styrene, vinyl chloride, vinyl acetate, vinylidene chlorofluoride and methyl methacrylate, the ethylene polymer or copolymer being present in a sufficient amount, usually a major amount, i.e. about 85% weight or more, to present the stabilization problem resolved by the invention, also can be stabilized. The term "ethylene polymer" as used herein includes, accordingly, homopolymers such as low or high density polyethylene, and Ziegler polyethylene and ethylene copolymers, and mixtures of ethylene homopolymers, as discussed above.

The stabilizers of the invention can also be used with other olefin polymers, such as polypropylene, poly(butene-1), poly(pentene-1), poly(3-methyl butene-1), poly-4-methyl-pentene-1, and polystyrene.

The term "olefin polymer" encompasses both homopolymers and copolymers, as well as mixtures of olefin polymers.

The stabilizer is incorporated in the polymer in suitable mixing equipment, such as a mill, a Banbury mixer, an extruder and the like. If the ethylene polymer has a melt viscosity which is too high for the desired use, the ethylene polymer can be worked until its melt visocity has been reduced to the desired range, before addition of the stabilizer. The resulting mixture is then removed from the mixing equipment, and brought to the size and shape desired, for marketing or use.

The stabilized olefin polymer can be worked into the desired shape, such as by milling, calendering, extrusion, or injection molding or fiber-forming.

The term "consisting essentially of," as used herein, means that the ingredients recited in the specification and claims are the essential ingredients of the composition of the invention and no others are employed which would be undesirable in the enhancement of the resistance of olefin polymers to deterioration in physical properties due to exposure to heat.

The following examples in the opinion of the inventors represent preferred embodiments of the invention.

Examples 1 to 6

In Examples 1 to 6, various trialkylphenylmercaptoalkylene phosphites are incorporated into samples of polyethylene as follows. Stabilizers are weighed and dispersed in previously unstabilized polyethylene (NH 323), melt indexing, 0.15 ASTM D1238–62T at 190° C., using a two-pound laboratory Banbury mixer. The mixture is placed in a cold roll mill and is flattened and the crepe produced cut to convenient size for subsequent tests. The samples are oven aged at 100° C. and exposed to prolonged roll milling at 320° F. as described in Example 1.

The stabilizers and amounts that are incorporated into the polyethylene are set forth in Table I below.

melt index 0.4, ASTM D–1238–57T at 190° C. by dispersing the phosphites in the polypropylene. The mixture is placed on a 2-roll mill and fluxed for 5 min. at 170° C. and sheeted off. Pieces cut from the mill sheet contain about 0.1% of the phosphite and are oven aged at 150° C. Each sample is found to have improved stability over the unstabilized polypropylene after it is heat aged in an oven for various times at 150° C.

Examples 19 to 24

The various two-component stabilizer systems employed in Examples 7 to 12 which include the trialkylphenylmercaptoalkylene phosphites used in Examples 1 to 6, with various hindered phenols, are added to samples of polypropylene as described in Examples 13 to 18. The samples which contain 0.1% of the phosphite and 0.05% of the hindered phenol are oven aged at 150° C.

Each sample is found to have improved stability over the unstabilized polypropylene after it is heat aged in an oven for various times at 150° C.

Examples 25 to 30

Two trialkylphenylmercaptoalkylene phosphites each in combination with 4,4'-methylenebis(2,6 - di - tert - butyl phenol) (Ethyl 7027) with carbon black added as a light stabilizer in accordance with the invention were evalu-

TABLE I

| Example No. | Trialkylphenylmercaptoalkyl phosphite | Amount percent | Results |
|---|---|---|---|
| 1 | Tri(4-tertbutylphenylthioethyl) phosphite. | 0.1 | Each sample has improved stability over the untabilized polymer after it is heat aged in an oven for various times up to 292 hours at 100° C. and after is is exposed to roll milling at 320° F. for various times up to 6 hours. |
| 2 | Tri(2-methyl-4-tert-butylphenylthioethyl)phosphite. | 0.1 | |
| 3 | Tri(2,4-di-tertbutylphenylthioisopropyl) phosphite. | 0.1 | |
| 4 | Tri(2-isoamylphenylthioethyl) phosphite. | 0.1 | |
| 5 | Tri(2-ethyl-4-butylphenylthioethyl) phosphite. | 0.1 | |
| 6 | Tri(2,4,5-tert-butylphenylthio) phosphite. | 0.1 | |

Examples 7 to 12

In Examples 7 to 12, two-component stabilizer systems of the invention containing trialkylphenylmercaptoalkylene phosphites used in Examples 1 to 6, with various hindered phenols are added to samples of polyethylene as described in Examples 1 to 6. The samples are oven aged at 100° C. and exposed to prolonged roll milling at 320° F. as described in Example 1.

The stabilizers and amounts that are incorporated into the polyethylene are set forth in Table II below.

ated for their inhibiting effect on changes in physical and chemical states of polyethylene undergoing differential thermal analysis as detected by a Du Pont 900 DTA apparatus equipped with a 900 250-time base accessory. For purposes of comparison, a composition of the hindered phenol and tri(phenylthioethyl) phosphite (Controls A, B and C) were also tested. The Du Pont apparatus contains a recorder which measures temperature as a function of time (chart speed). 0.2 g. pellet samples were placed in a 4 mm. diameter sample tube and inserted in the apparatus. Nitrogen gas was flowed at a

TABLE II

| Example No. | Mercapto phosphite and amount | Hindered phenol | Amount Percent | Results |
|---|---|---|---|---|
| 7 | Tri(4-tertbutylphenylthioethyl) phosphate, 0.1%. | 4,4'-methylene-bis(6-tert-butyl-o-cresol | 0.05 | Each combination has improved stability over the unstabilized polymer after it is heat aged in an oven for various times up to 292 hours at 100° C. and after it is exposed to roll milling at 320° F. for various times up to 6 hours. |
| 8 | Tri(2-methyl-4-tert-butyl-phenylthioethyl)phosphite, 0.1%. | 2,2'-methylene-bis(6-tert-butyl-phenol. | 0.05 | |
| 9 | Tri(2,4-di-tertbutyl phenylthioisopropyl) phosphite, 0.1%. | 3,5-di-tert-butyl-4-hydroxy benzyl ether. | 0.05 | |
| 10 | Tri(2-isoamylphenythioethyl) phosphate, 0.1%. | 2-ethyl-4-octyl-6-methyl resorcinol | 0.05 | |
| 11 | Tri(2-ethyl-4-butylphenylthioethyl) phosphite, 0.1%. | 1,3,5-tri-methyl-2,4,6-tris(3,5-di-tert-butyl-4-hydroxy benzyl) benzene. | 0.05 | |
| 12 | Tri(2,4,5-tert-butylphenylthioethyl) phosphite, 0.1%. | 4,4'-cyclohexylidene-bis(2,6-di-tert-butyl phenol). | 0.05 | |

Examples 13 to 18

The various trialkylphenylmercaptoalkylene phosphites employed in Examples 1 to 6 are incorporated into samples of powdered previously unstabilized polypropylene (Profax 6501) reduced specific viscosity (RSV) 3.0, rate of 30 ml./min. over the surface of the sample while the sample was heated to 200° C. Thereafter, the nitrogen was replaced by oxygen flowing at a rate of 30 ml./min. and the recorder started. When a noticeable break appeared in the trace, the induction time was obtained from the chart speed which was set at 0.1 in./min. The composition of each sample and the results obtained for each sample are recorded in Table III below.

TABLE III

| Example No. | 25 | 26 | Control A | 27 | 28 | Control B | 29 | 30 | Control C |
|---|---|---|---|---|---|---|---|---|---|
| Polyethylene | 100 | 100 | 100 | 100 | 100 | 100 | 100 | 100 | 100 |
| Tri(4-tert-butylphenylthioethyl) phosphite | 0.1 | | | 0.1 | | | 0.05 | | |
| Tri(2-methyl-4-tert-butylphenyl-thioethyl)phosphite | | 0.1 | | | 0.1 | | | 0.05 | |
| Tri(laurylthioethyl)phosphite | | | | | | | | | |
| Tri(phenylthioethyl)phosphite | | | 0.1 | | | 0.1 | | | 0.05 |
| 4,4'-methylenebis(2,6-di-tert-butylphenol) | 0.05 | 0.05 | 0.05 | 0.05 | 0.05 | 0.05 | 0.05 | 0.05 | 0.05 |
| Carbon black | | | | 2.6 | 2.6 | 2.6 | 2.6 | 2.6 | 2.6 |
| Induction time (min.) | 82 | 52 | 47 | 145 | 167 | 103 | 106 | 126 | 78 |

As seen from the results in Table III above, the two-component stabilizing combination of the invention (Examples 25 and 26) was very effective in inhibiting a change in state of the polyethylene undergoing differential thermal analysis. In comparing the results obtained using the tri(phenylthioethyl) phosphite (Control A) in place of the trialkylphenylmercaptoalkylene phosphite of the invention, it is seen that the tri(4-tert-butylphenylthioethyl) phosphite and phenol of Example 25 was about 74.5% more effective than the tri(phenylthioethyl) phosphite and phenol of Control A and the tri(2-methyl-4-tert-butyl-phenylthioethyl) phosphite and phenol of Example 26 was about 10.5% more effective than the tri(phenylthioethyl) phosphite and phenol of Control A.

When carbon black is incorporated into Examples 25 and 26 and Control A, it is seen that the tri(4-tert-butylphenylthioethyl) phosphite (Example 27) is about 40% more effective and the tri(2-methyl-4-tert-butylphenylthioethyl) phosphite (Example 28) is about 62% more effective than the tri(phenylthioethyl) phosphite of Control B.

When the content of the phosphite is reduced from 0.1 part to 0.05 part per 100 parts polyethylene, it is seen that the tri(4-tert-butylphenylthioethyl) phosphite of Example 29 is about 36% more effective and the tri-(2-methyl - 4-tert - butylphenylthioethyl) phosphite (Example 30) is about 49% more effective than the tri-(phenylthioethyl) phosphite of Control C.

Accordingly, the trialkylphenylmercaptoalkylene phosphites of the invention are very much superior to triphenylmercaptoalkylene phosphites in inhibiting change in state of polyethylene undergoing differential thermal analysis.

Having regard to the foregoing disclosure, the following is claimed as the inventive and patentable embodiments thereof:

1. An olefin polymer composition having enhanced resistance to deterioration in physical properties due to exposure to heat, consisting essentially of an olefin polymer and a trialkylphenylmercaptoalkylene phosphite having the formula:

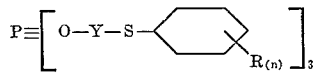

in which Y is an alkylene group having from one to ten carbon atoms, R is an alkyl group having from one to twelve carbon atoms and n is an integer from one to five present in an amount sufficient to increase the resistance of the polymer to heat deterioration.

2. An olefin polymer composition in accordance with claim 1 wherein the olefin polymer is a propylene polymer.

3. An olefin polymer composition in accordance with claim 1 wherein the olefin polymer is an ethylene polymer.

4. An olefin polymer composition in accordance with claim 1 wherein the trialkylphenylmercaptoalkylene phosphite is tri(2-methyl-4-tert butylphenylthioethyl) phosphite.

5. An olefin polymer composition in accordance with claim 1 wherein the trialkylphenylmercaptoalkylene phosphite is tri(4-tert-butylphenylthioethyl) phosphite.

6. An olefin polymer composition in accordance with claim 1 wherein the trialkylphenylmercaptoalkylene from about eight to about three hundred carbon atoms.

7. An olefin polymer composition in accordance with claim 6 including in addition, carbon black.

8. An olefin polymer composition in accordance with claim 6 wherein the hindered phenol has the formula

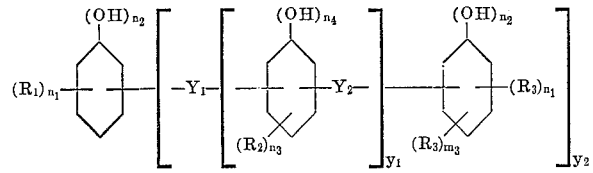

wherein $R_1$, $R_2$ and $R_3$ are inert substitutes selected from the group consisting of halogen, and organic radicals containing from one to about thirty carbon atoms selected from the group consisting of alkyl, aryl, alkenyl, alkaryl, aralkyl, cycloalkenyl, cycloalkyl, alkoxy, aryloxy and acyl groups, $Y_1$ and $Y_2$ are selected from the group consisting of oxygen, alkylene, alicyclene, arylene, and mixed alkylene-arylene and alkylene-alicyclene groups, and both the $R_1$ and $R_3$ radicals are ortho to one hydroxyl group unless Y is in an ortho position, $n_1$ and $n_2$ are integers from one to four, and the sum of $n_1$ and $n_2$ does not exceed six, $n_3$ is an integer from zero to three, and $n_4$ is an integer from one to three, $y_1$ is an integer from zero to six and $y_2$ is an integer from one to five.

9. An olefin polymer composition in accordance with claim 8, wherein the hindered phenol is 4,4'-methylenebis-(2,6-di-tert-butyl-phenol).

10. An olefin polymer composition in accordance with claim 8 wherein the hindered phenol is 4,4'-methylenebis (6-tert-butyl-o-cresol).

11. An olefin polymer composition in accordance with claim 8 wherein the hindered phenol is 2,2'-methylenebis-(6-tert-butyl phenol).

12. An olefin polymer composition in accordance with claim 8 wherein the trialkylphenylmercaptoalkylene phosphite is tri(4-tert-butylthioethyl) phosphite and the hindered phenol is 4,4'-methylene - bis(2,6-di - tert-butyl phenol).

13. An olefin polymer composition in accordance with claim 8 wherein the trialkylphenylmercaptoalkylene phosphite is tri(2-methyl-4-tert-butylphenylthioethyl) phosphite and the hindered phenol is 4,4'-methylene-bis(2,6-di-tert-butyl phenol).

References Cited

UNITED STATES PATENTS

| 2,587,616 | 3/1952 | Harman | 260—45.7 |
| 2,293,445 | 8/1942 | Nelson | 252—52 |
| 3,025,316 | 3/1962 | Lorenz et al. | 260—949 |
| 3,060,217 | 10/1962 | Schrader | 260—949 |

DONALD E. CZAJA, *Primary Examiner.*

H. E. TAYLOR, JR., *Assistant Examiner.*

UNITED STATES PATENT OFFICE
CERTIFICATE OF CORRECTION

Patent No. 3,413,258                                              November 26, 1968

Harry Braus et al.

It is certified that error appears in the above identified patent and that said Letters Patent are hereby corrected as shown below:

Column 10, line 16, "wherein the trialkyphenylmercaptoalkylene" should read -- including, in addition, a hindered phenol having --.

Signed and sealed this 31st day of March 1970.

(SEAL)
Attest:

Edward M. Fletcher, Jr.                                    WILLIAM E. SCHUYLER, JR.
Attesting Officer                                                     Commissioner of Patents